(12) United States Patent
Park et al.

(10) Patent No.: US 11,651,392 B2
(45) Date of Patent: May 16, 2023

(54) ELECTRONIC APPARATUS AND CONTROL METHOD THEREOF

(71) Applicant: SAMSUNG ELECTRONICS CO., LTD., Suwon-si (KR)

(72) Inventors: Sanghun Park, Suwon-si (KR); Kunhee Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 98 days.

(21) Appl. No.: 17/231,486

(22) Filed: Apr. 15, 2021

(65) Prior Publication Data

US 2021/0382806 A1 Dec. 9, 2021

(30) Foreign Application Priority Data

Jun. 9, 2020 (KR) .......................... 10-2020-0069605

(51) Int. Cl.
*G06Q 30/0251* (2023.01)
*G06F 11/34* (2006.01)
*G06F 18/22* (2023.01)
*G06F 18/2413* (2023.01)

(52) U.S. Cl.
CPC ..... *G06Q 30/0251* (2013.01); *G06F 11/3438* (2013.01); *G06F 11/3476* (2013.01); *G06F 18/22* (2023.01); *G06F 18/24137* (2023.01)

(58) Field of Classification Search
CPC ............................ G06F 16/35; G06Q 30/0277; G06Q 30/0269; A63F 13/795; A63F 13/79
See application file for complete search history.

(56) References Cited

U.S. PATENT DOCUMENTS

| | | | |
|---|---|---|---|
| 7,877,387 B2 | 1/2011 | Hangartner | |
| 8,255,949 B1 | 8/2012 | Bayer et al. | |
| 8,635,103 B1 | 1/2014 | West et al. | |
| 9,262,742 B2 | 2/2016 | Moonka et al. | |
| 9,681,159 B2 | 6/2017 | Jain et al. | |
| 10,089,393 B2 | 10/2018 | Mackay et al. | |

(Continued)

FOREIGN PATENT DOCUMENTS

| | | |
|---|---|---|
| KR | 1020140138379 A | 12/2014 |
| KR | 1020150101537 A | 9/2015 |
| WO | 2013181636 A2 | 12/2013 |

OTHER PUBLICATIONS

International Search Report (PCT/ISA/210) and Written Opinion (PCT/ISA/237) dated Jul. 21, 2021 issued by the International Searching Authority in International Application No. PCT/KR2021/003670.

*Primary Examiner* — Mahran Y Abu Roumi
(74) *Attorney, Agent, or Firm* — Sughrue Mion, PLLC

(57) ABSTRACT

An electronic apparatus includes a processor configured to acquire a plurality of characteristic data of a plurality of users through a communication interface circuitry; identify a plurality of categories and reference characteristics for analyzing the plurality of characteristic data according to an input received through the communication interface circuitry; identify specific characteristic data that corresponds to the reference characteristics, among the plurality of characteristic data for each of the plurality of categories; identify a specific user having the specific characteristic data, among the plurality of users; and output an analysis result of the specific characteristic data of the specific user.

10 Claims, 12 Drawing Sheets

(56) References Cited

U.S. PATENT DOCUMENTS

| | | |
|---|---|---|
| 10,242,386 B2 | 3/2019 | Hong et al. |
| 10,346,871 B2 | 7/2019 | Jeon et al. |
| 10,373,197 B2 | 8/2019 | Jordon et al. |
| 2007/0078836 A1 | 4/2007 | Hangartner |
| 2010/0250557 A1* | 9/2010 | Moon ............... G06Q 30/02 708/441 |
| 2012/0054189 A1 | 3/2012 | Moonka et al. |
| 2014/0180804 A1 | 6/2014 | Jordan et al. |
| 2016/0026669 A1* | 1/2016 | Honda ............... A63F 13/795 707/749 |
| 2017/0034547 A1 | 2/2017 | Jain et al. |
| 2017/0178197 A1* | 6/2017 | Hong ............... G06F 16/35 |
| 2017/0308924 A1 | 10/2017 | Jeon et al. |

\* cited by examiner

| USER ID | $V_1$ | $V_2$ | $V_3$ | ... | $V_N$ |
|---------|-------|-------|-------|-----|-------|
| $ID_1$ | $V_1(ID_1)$ | $V_2(ID_1)$ | $V_3(ID_1)$ | ... | $V_N(ID_1)$ |
| $ID_2$ | $V_1(ID_2)$ | $V_2(ID_2)$ | $V_3(ID_2)$ | ... | $V_N(ID_2)$ |
| $ID_3$ | $V_1(ID_3)$ | $V_2(ID_3)$ | $V_3(ID_3)$ | ... | $V_N(ID_3)$ |
| ... | ... | ... | ... | ... | ... | and more specifically, to an electronic apparatus for identifying external apparatuses of users having a specific tendency in providing customized services suitable for various users' tendencies to each external apparatus and a control method thereof.

ELECTRONIC APPARATUS AND CONTROL METHOD THEREOF

CROSS-REFERENCE TO RELATED APPLICATION(S)

This application claims benefit of priority to Korean Patent Application No. 10-2020-0069605 filed on Jun. 9, 2020 in the Korean Intellectual Property Office, the disclosure of which is incorporated herein by reference in its entirety.

BACKGROUND

1. Field

The disclosure relates to an electronic apparatus capable of managing data on a plurality of external apparatuses and providing preset services to each external apparatus and a control method thereof, and more specifically, to an electronic apparatus for identifying external apparatuses of users having a specific tendency in providing customized services suitable for various users' tendencies to each external apparatus and a control method thereof.

2. Description of Related Art

In order to compute and process predetermined information according to a specific process, an electronic apparatus basically including electronic components such as a central processing unit (CPU), a chipset, and a memory for computation may be classified into various types depending on what information is to be processed or what its purpose is. For example, the electronic apparatus includes an information processing apparatus such as a personal computer (PC) or a server that processes general-purpose information, an image processing apparatus that processes image data, an audio apparatus that processes audio, a household appliance that performs household chores, and the like. The image processing apparatus may be implemented as a display apparatus that displays the processed image data as an image on a display panel included in the image processing apparatus. Such various types of electronic apparatuses may each function as a server and a client capable of communicating with each other.

The electronic apparatus functioning as the server communicates with a plurality of external apparatuses functioning as the client through a network. Using this one-to-many communication network, the server may provide various services to the external apparatuses. As an example of providing a service, the server may display a web page that guides information on a plurality of services, and when the client accessing the web page selects a desired service, may use a passive method of transmitting content data of the selected service to the corresponding client. Alternatively, the server may individually determine tendencies of each client and use an active method of providing or guiding services prepared in response to the determined tendency to the client.

The above-described active method has been used in, for example, a personalized item recommendation system to construct services such as an item or product suitable for a specific user. However, among many clients managed by the server, it is not easy to identify clients' specific tendency or preference. For example, when information on a small number of clients having a predetermined common tendency is input from an administrator, the server compares data on the tendency appearing in the input information with data of each client managed by the server on a one-to-one basis. However, when the data of the client managed by the server constitutes a vast amount of big data, this comparison method becomes a heavy burden on the server and causes a significant time delay.

Accordingly, when the server provides a service corresponding to a specific tendency, a method for relatively quickly and easily identifying clients having the corresponding tendency or characteristics similar to the corresponding tendency may be required.

SUMMARY

According to an aspect of the disclosure, an electronic apparatus may include: a communication interface circuitry; and a processor configured to: acquire a plurality of characteristic data of a plurality of users through the communication interface circuitry, identify a plurality of categories and reference characteristics for analyzing the plurality of characteristic data according to an input received through the communication interface circuitry; identify specific characteristic data that corresponds to the reference characteristics, among the plurality of characteristic data for each of the plurality of categories; identify a specific user having the specific characteristic data, among the plurality of users; and output an analysis result of the specific characteristic data of the specific user.

The processor may be further configured to assign a weight to each of the plurality of characteristic data for each of the plurality of categories and identify the specific user based on the plurality of characteristic data to which the weigh is assigned.

The processor may be further configured to calculate first similarities between the plurality of characteristic data and the reference characteristics for each of the plurality of categories, obtain a second similarity by integrating the first similarities for each of the plurality of categories, and identify the specific user corresponding to the reference characteristics based on the second similarity.

The processor may be further configured to identify the specific user based on the second similarity of the specific characteristic data with respect to the reference characteristics being higher than or equal to a predetermined ranking.

The processor may be further configured to identify the specific user, based on the second similarity of the specific characteristic data with respect to the reference characteristics being greater than or equal to a threshold value.

The processor may be further configured to assign a set of weights to the first similarities for the plurality of categories.

The weights may be provided differently according to predetermined importance values that are respectively set for the plurality of categories.

The specific characteristic data of the specific user may include a vector value based on a behavior pattern of the specific user derived from a usage history of an external apparatus.

The processor may be further configured to identify whether the specific characteristic data corresponds to the reference characteristics, based on a Euclidean distance between the reference characteristics and the specific characteristic data of the specific user.

The processor may be further configured to derive a centroid of the reference characteristics, and identify whether the specific characteristic data corresponds to the reference characteristics based on the Euclidean distance between the centroid and the specific characteristic data of the specific user.

The centroid is an average of coordinate values of the reference characteristics on a Euclidean plane.

According to another aspect of the disclosure, a control method of an electronic apparatus may include: acquiring a plurality of characteristic data of a plurality of users; identifying a plurality of categories and reference characteristics for analyzing the plurality of characteristic data according a received input; identifying specific characteristic data that corresponds to the reference characteristics, among the plurality of characteristic data for each of the plurality of categories; identifying a specific user having the specific characteristic data, among the plurality of users; and outputting an analysis result of the specific characteristic data of the specific user.

The identifying the specific user may include: assigning a weight to each of the plurality of characteristic data for each of the plurality of categories; and identifying the specific user based on the plurality of characteristic data to which the weight is assigned.

The identifying the specific user may include: calculating first similarities between the plurality of characteristic data and the reference characteristics; obtaining a second similarity by integrating the first similarities for each of the plurality of categories; and identifying the specific user users corresponding to the reference characteristics based on the second similarity.

The identifying the specific user may include: identifying the specific user based on the second similarity of the specific characteristic data with respect to the reference characteristics being higher than or equal to a predetermined ranking.

The identifying the specific user may include: identifying the specific user based on the second similarity of the specific characteristic data with respect to the reference characteristics being greater than or equal to a threshold value.

The identifying the specific user may include: assigning a set of weights to the first similarities for the plurality of categories.

The assigning the set of weights may include: providing the weights differently according to predetermined importance values that are respectively set for the plurality of categories.

The specific characteristic data of the specific user may include a vector value based on a behavior pattern of the specific user derived from a usage history of an external apparatus.

The identifying the specific characteristic data may include: identifying the specific characteristic data based on a Euclidean distance between the reference characteristics and the specific characteristic data.

According to another aspect of the disclosure, a server may include: at least one memory configured to store one or more instructions; and at least one processor configured to execute the one or more instructions to: collect a plurality of characteristic data that show internet activities of a plurality of users; identify specific characteristic data that corresponds to reference characteristic data, among the plurality of characteristic data, based on a Euclidean distance between each of the plurality of characteristic data and the reference characteristic data; identify a specific user having the specific characteristic data, among the plurality of users; and provide a targeted advertising service to the specific user.

BRIEF DESCRIPTION OF DRAWINGS

The above and/or other aspects will be more apparent by describing certain example embodiments, with reference to the accompanying drawings, in which:

FIG. 4 is an exemplary diagram illustrating a table format of feature data for each user;

DETAILED DESCRIPTION

Figure 1:
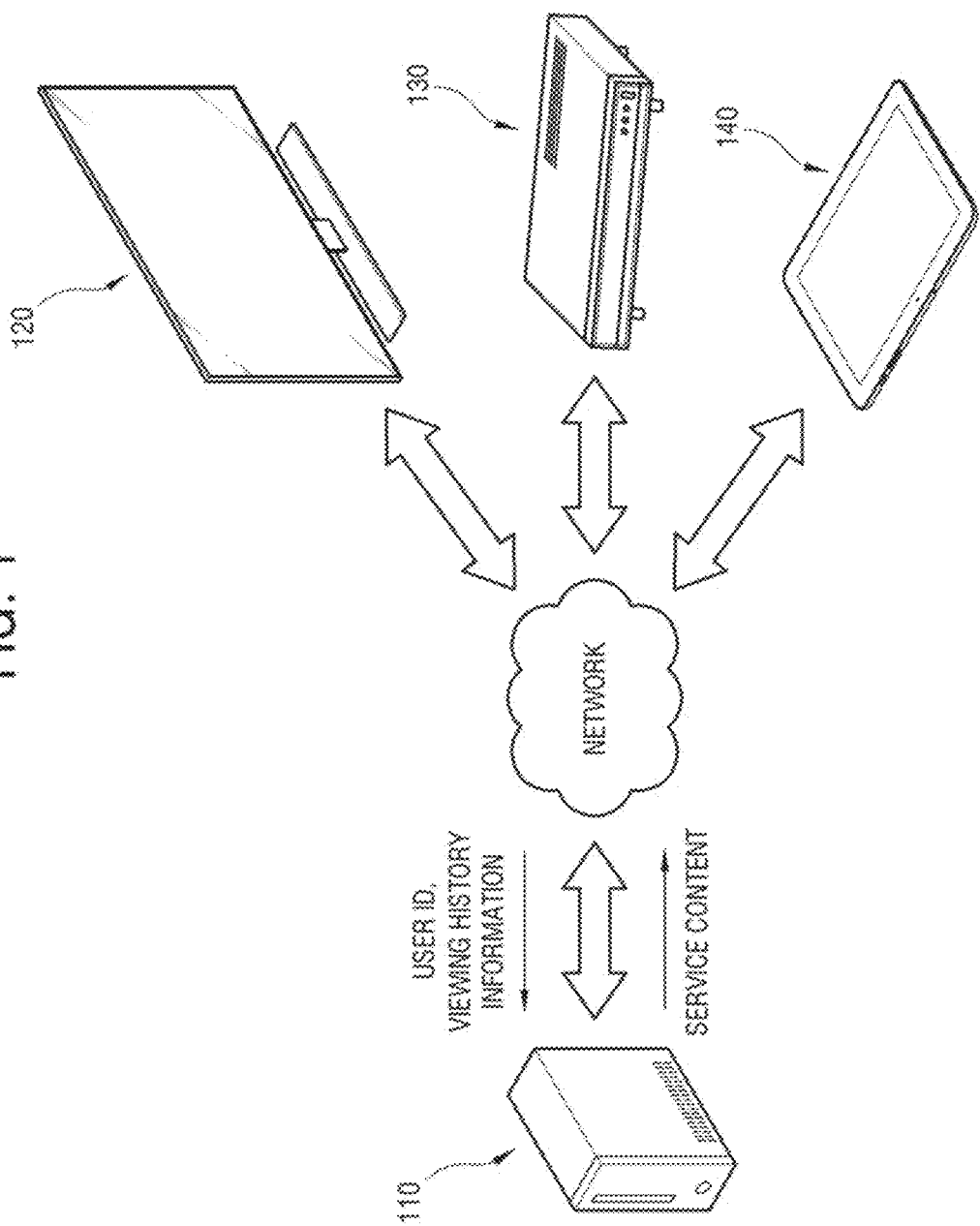
FIG. 1 is an exemplary diagram of an electronic apparatus communicating with a plurality of external apparatuses.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

In the case where the expression "at least one" of a plurality of elements in the present specification appears, the expression refers to not only all of the plurality of components, but also each one of the plurality of components excluding the rest components or all combinations thereof. For example, the expression, "at least one of a, b, and c," should be understood as including only a, only b, only c, both a and b, both a and c, both b and c, all of a, b, and c, or any variations of the aforementioned examples.

FIG. 1 is an exemplary diagram of an electronic apparatus communicating with a plurality of external apparatuses.

As illustrated in FIG. 1, the electronic apparatus 110 according to the embodiment of the disclosure is implemented as, for example, a server, and is provided to communicate with a plurality of external apparatuses 120, 130, and 140 respectively through a network. However, the electronic apparatus 110 is not necessarily limited to the server and may be implemented by various types of devices. For example, the electronic apparatus 110 may be a host apparatus (or a server, or a master apparatus) communicatively connected to each of various types of external apparatuses 120, 130, and 140 (or various types of slave or client apparatuses 120, 130, and 140). The electronic apparatus 110 and the external apparatuses 120, 130, and 140 may be connected to each other in various ways, such as a wide area network, a local area network, and a one-to-many connection by a cable.

In addition, in the present embodiment, only a case in which one electronic apparatus 110 performs a related operation is described, but this is only an example. This embodiment may be applied even when the plurality of electronic apparatuses 110 operate in conjunction with each other. In this case, the plurality of electronic apparatuses 110 may share and perform related operations.

The external apparatuses 120, 130, and 140 may be implemented as various types of apparatuses. The external apparatuses 120, 130, and 140 may be implemented as various types of apparatuses such as a fixed display apparatus including a TV, a monitor, a digital signage, an electronic blackboard, or an electronic frame; an image processing apparatus including a set-top box, an optical media player, or the like; an information processing apparatus including a computer body or the like; a household appliance including a washing machine, a refrigerator, a clothes manager, or the like; a mobile device including a smart phone, a tablet device, or the like; or a wearable device. This embodiment describes that three external apparatuses 120, 130, and 140 are connected to the electronic apparatus 110, but in reality, the number of external apparatuses 120, 130, which is communicatively connected to the electronic apparatus 110, is not limited.

The electronic apparatus 110 is provided to identify a plurality of communicating external apparatuses 120, 130, and 140 from each other. The electronic apparatus 110 may identify external apparatuses 120, 130, and 140 based on an ID of each external apparatus 120, 130, and 140, or an ID of a user who uses (or who is signed in on) each external apparatus 120, 130, and 140. The IDs of the external apparatuses 120, 130, and 140 may be provided in advance in the corresponding external apparatuses 120, 130, and 140 or may be input by the user from the external apparatuses 120, 130, and 140, and then may be transmitted from the external apparatuses 120, 130, and 140 to the electronic apparatus 110. Alternatively, the electronic apparatus 110 may randomly allocate IDs to each of the external apparatuses 120, 130, and 140 that can communicate with the electronic apparatus 110.

The electronic apparatus 110 manages IDs of each external apparatus 120, 130, and 140, and stores usage history information of a user in each external apparatus 120, 130, and 140. For example, in each external apparatus 120, 130, and 140, the user views various types of content or the usage history is accumulated. Feature data related to a viewing pattern or a behavior pattern of a user of each external apparatus 120, 130, and 140 may be individually derived from the usage history for each external apparatus 120, 130, and 140. The electronic apparatus 110 may receive the feature data derived from each external apparatus 120, 130, and 140, or may derive the feature data from the usage history received from each external apparatus 120, 130, and 140. The electronic apparatus 110 stores and manages the acquired feature data to correspond to the IDs of each external apparatus 120, 130, and 140.

The electronic apparatus 110 may provide individually preset customized services to each external apparatuses 120, 130, and 140. As an example of the customized services, a case will be described in which advertisement of a predetermined product is provided to the external apparatuses 120, 130, and 140. Even when content other than advertisement is provided as a service, the embodiment of the disclosure may be applied.

The electronic apparatus 110 may commonly provide advertisement of a specific product to all the external apparatuses 120, 130, and 140. However, since the user's tendency and preference are not the same, the advertisement may be relatively useful to users who prefer the corresponding product, but the advertisement may not be useful to users who do not prefer the corresponding product. That is, the electronic apparatus 110 selects users who prefer the corresponding product within big data of users of the external apparatuses 120, 130, and 140 managed by the electronic apparatus 110, and provides the customized advertisement to the selected users. The big data may include clickstream data that may refer to a record of web pages that users have visited, and may also include search data, purchase data, profile data. The big data may be collected by monitoring internet activities of the users.

Therefore, in order for the electronic apparatus 110 according to the embodiment of the disclosure to provide a predetermined service, when the tendency or characteristics that the service is determined to be useful are primarily determined, the electronic apparatus 110 secondarily selects users or the external apparatuses 120, 130, and 140 having the same or similar tendency or characteristics as or to the determined tendency or characteristics. The electronic apparatus 110 provides the corresponding services (e.g., personalized or targeted advertising, recommending certain products or video contents, etc.) to the users or external apparatuses 120, 130, and 140 that are secondarily selected in this way. Accordingly, the electronic apparatus 110 may identify users having characteristics that are determined to be effective in providing the specific services.

Hereinafter, the configuration of the electronic apparatus 110 will be described.

Figure 2:
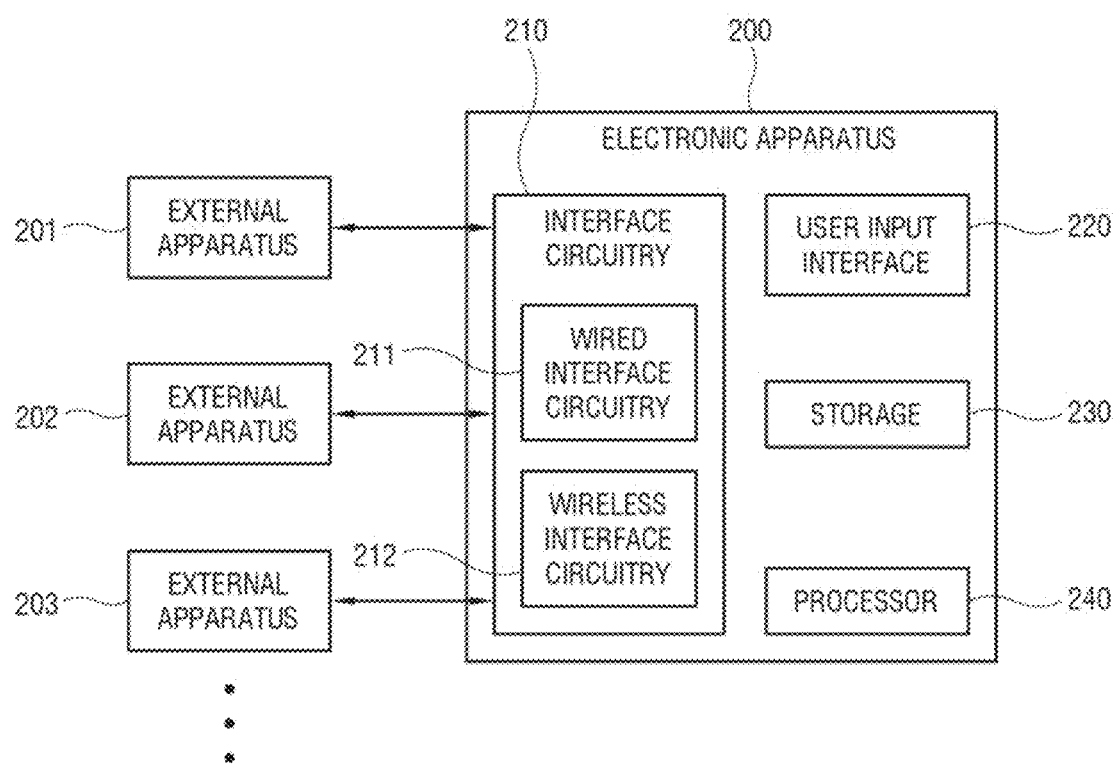
FIG. 2 is a block configuration diagram of the electronic apparatus.

FIG. 2 is a block configuration diagram of the electronic apparatus.

As illustrated in FIG. 2, an electronic apparatus 200 may include an interface circuitry 210. The interface circuitry 210 includes an interface circuit for the electronic apparatus 200 to communicate with a plurality of external apparatuses 201, 202, and 203, and to transmit and receive data, and may be also referred to as a communication interface circuitry. The interface circuitry 210 includes one or more wired interface circuitry 211 for wired communication connection and one or more wireless interface circuitry 212 for wireless communication connection, according to a connection method. In this embodiment, the interface circuitry 210 includes both the wired interface circuitry 211 and wireless interface circuitry 212, but may include only one of the wired interface circuitry 211 or the wireless interface circuitry 212, according to the design method.

The wired interface circuitry 211 includes a connector or a port to which a cable of a predefined transmission standard is connected. For example, the wired interface circuitry 211 is connected to a terrestrial or satellite broadcasting antenna to receive a broadcast signal, or includes a port to which a cable of cable broadcasting is connected. Alternatively, the wired interface circuitry 211 includes a port to which cables of various wired transmission standards such as High-Definition Multimedia Interface (HDMI), Display Port (DP), Digital Visual Interface (DVI), a component, composite, S-Video, and Thunderbolt are connected to connect to various image processing apparatuses. Alternatively, the wired interface circuitry 211 includes a Universal Serial Bus (USB) standard port for connecting to a USB device. Alternatively, the wired interface circuitry 211 includes an optical port to which an optical cable is connected. Alternatively, the wired interface circuitry 211 includes an audio input port to which an external microphone is connected and an audio output port to which a headset, an earphone, an external speaker, and the like are connected. Alternatively, the wired interface circuitry 211 includes an Ethernet port connected to a gateway, a router, a hub, or the like to access a wide area network.

The wireless interface circuitry 212 includes a two-way communication circuit including at least one or more of components such as a communication module and a communication chip corresponding to various types of wireless communication protocols. For example, the wireless interface circuitry 212 is a Wi-Fi communication chip that performs wireless communication with an access point (AP) according to a Wi-Fi method, communication chips performing wireless communication such as Bluetooth, Zigbee, Z-Wave, WirelessHD, WiGig, and NFC, an IR module for IR communication, a mobile communication chip performing mobile communication with a mobile device, and the like.

The electronic apparatus 200 may include a user input interface 220. The user input interface 220 includes various types of input interface related circuits that are provided to be manipulated by a user in order to perform user input. In terms of an input/output interface, the user input interface 220 may be classified as a component included in the interface circuitry 210. The user input interface 220 may be configured in various forms according to the type of the electronic apparatus 200, and the user input interface 200 includes, for example, a mechanical or electronic button unit of the electronic apparatus 200, a touch pad, a sensor, a camera, a touch screen, a remote control separated from the electronic apparatus 200, and the like.

The electronic apparatus 200 may include a storage 230. The storage 230 stores digitized data. The storage 230 includes a nonvolatile storage that may preserve data regardless of whether the nonvolatile storage is supplied with power, and a volatile memory that may be loaded with data to be processed by a processor 240 and may not preserve data when the volatile memory is not supplied with power. The storage 230 includes a flash-memory, a hard-disc drive (HDD), a solid-state drive (SSD), a read only memory (ROM), and the like, and the memory includes a buffer, a random access memory (RAM), and the like.

The electronic apparatus 200 may include the processor 240. The processor 240 includes one or more hardware processors implemented as a CPU, a chipset, a buffer, a circuit, and the like that are mounted on a printed circuit board, and may be implemented as a system on chip (SOC) depending on the design method. The processor 240 includes modules corresponding to various processes such as a demultiplexer, a decoder, a scaler, an audio digital signal processor (DSP), and an amplifier when the electronic apparatus is implemented as a display apparatus. Here, some or all of these modules may be implemented as SOC. For example, a module related to image processing such as a demultiplexer, a decoder, and a scaler may be implemented as an image processing SOC, and an audio DSP may be implemented as a separate chipset from the SOC.

The processor 240 identifies a plurality of communicable external apparatuses 201, 202, and 203 according to a user ID. When a condition for a target of services to be provided is input, the processor 240 selects user IDs that meet the condition within big data including various user IDs, and provides the corresponding services to the external apparatuses 201, 202, and 203 of the selected user IDs.

Hereinafter, an operation of the processor 240 according to the embodiment of the disclosure will be described.

Figure 3:
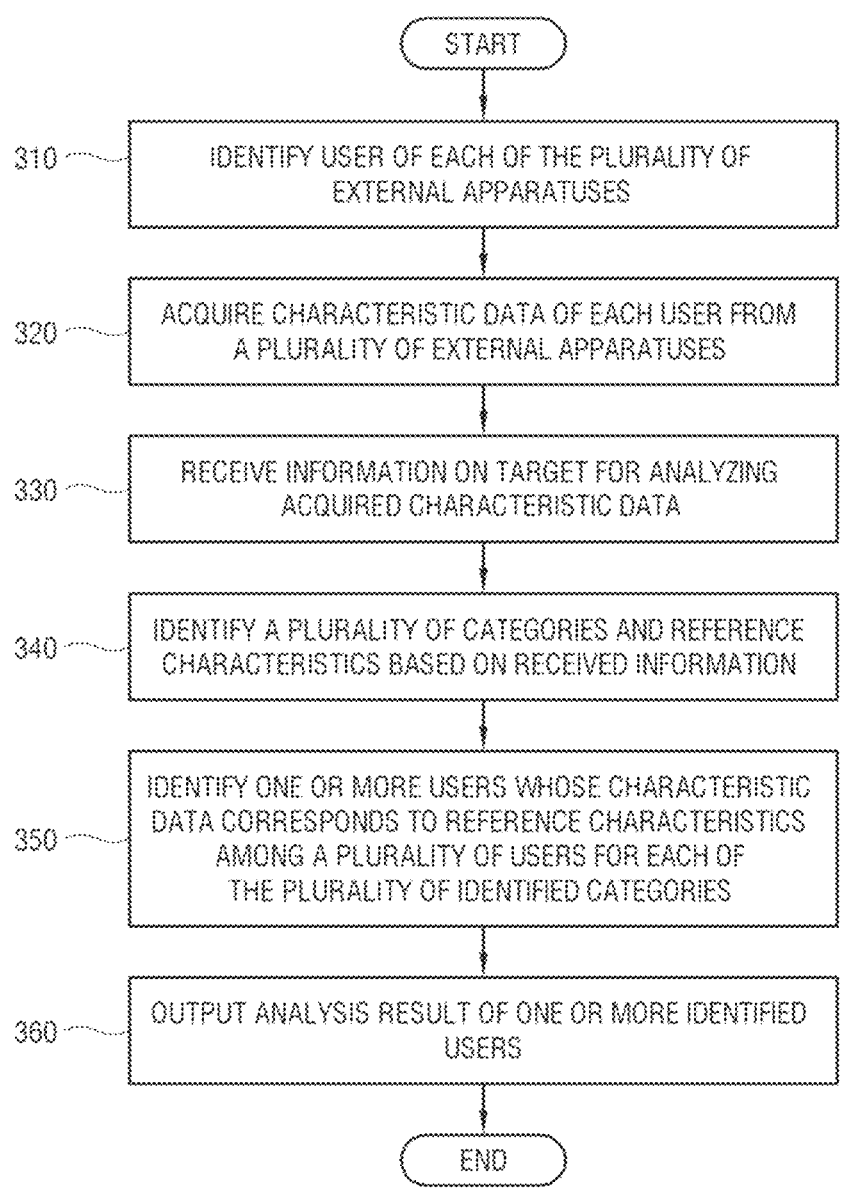
FIG. 3 is a flowchart illustrating an operation of the electronic apparatus.

FIG. 3 is a flowchart illustrating an operation of the electronic apparatus.

As illustrated in FIG. 3, the following operations are performed by the processor 240 (see FIG. 2) of the electronic apparatuses 110 and 200 (see FIGS. 1 and 2).

In operation 310, the electronic apparatus identifies users of the plurality of communicable external apparatuses. The electronic apparatus may identify the user of the external apparatus with the user IDs of each connected external apparatus.

In operation 320, the electronic apparatus acquires characteristic data of each user from the plurality of external apparatuses by monitoring internet activities of each user. The electronic apparatus receives the characteristic data from the external apparatus of the identified user and generates big data based on the characteristic data received from each external apparatus. The characteristic data may be provided in various standards and methods, and may have, for example, a form of vector data.

In operation 330, the electronic apparatus receives information on a target for analyzing the acquired characteristic data. This information may be input by the user of the electronic apparatus, and includes, for example, the standard of the user's tendency to be selected within the big data based on the characteristic data of the user.

In operation 340, the electronic apparatus identifies a plurality of categories and reference characteristics for analyzing the previously acquired characteristic data based on the received information. Here, the characteristic data of each user is defined to be classified by the plurality of categories, and the content and number of categories are not limited. Specifically, the characteristic data of one user includes N characteristic data corresponding to each of the N categories (N is a natural number). The reference characteristics refer to the standard of the user's tendency to be selected within the big data received in operation 330 described above.

In operation 350, the electronic apparatus identifies one or more users whose characteristic data corresponds to the identified reference characteristics from among the plurality of users for each of the identified categories.

In operation 360, the electronic apparatus outputs an analysis result of one or more identified users.

As a result, the electronic apparatus may easily identify users having a required tendency within the big data on various users' tendencies, and provide customized services to the identified users.

Hereinafter, the user of the external apparatus and the feature data of each user will be described.

FIG. 4 is an exemplary diagram illustrating a table format of feature data for each user.

As illustrated in FIG. 4, the electronic apparatuses 110 and 200 (see FIGS. 1 and 2) may store, for example, users of a plurality of communicable external apparatuses, and feature data related to tendencies or use patterns of each user in a format of a table 400. The table 400 illustrated in the present embodiment is only an example of a method in which the electronic apparatus stores the feature data, and the method in which the electronic apparatus stores the feature data is not limited to the format of the table 400.

The electronic apparatus may identify a user by acquiring the user ID of the external apparatus from the communicable external apparatus. For example, when the user of the external apparatus attempts to log in with a pre-registered user ID, the electronic apparatus authenticates the user ID to identify the user of the external apparatus.

Also, the electronic apparatus may acquire the characteristic data of each user from each external apparatus. The characteristic data of the user is data representing the user's tendency or preference, and represents the usage history of the user of various types of content or the behavior pattern of the user related to various types of content. For example, the user's tendency includes various matters such as (video or movie) viewing patterns and preferences for each genre or type of (TV program, movie, or video) content, whether to prefer various channels of broadcast programs, access patterns for various web sites, a viewing time of content, and whether to select advertisements for specific types of articles, whether to reselect video on demand (VOD) content, whether to execute a specific application.

Characteristic data related to a user includes a plurality of data belonging to a plurality of categories. Characteristic data of a user whose user ID is $ID_1$ includes data of a total of N categories of $V_1$ to $V_N$ (N is a natural number of 2 or more). For example, for the user whose user ID is $ID_1$, when characteristic data of category $V_1$ is represented by $V_1(ID_1)$, characteristic data of category $V_2$ is represented by $V_2(ID_1)$, characteristic data of category $V_3$ is represented by $V_3(ID_1)$, and characteristic data of $V_N$ is represented by $V_N(ID_1)$ for convenience, the characteristic data of the user with the $ID_1$ in which all categories are integrated becomes $[V_1(ID_1), V_2(ID_1), V_3(ID_1), \ldots, V_N(ID_1)]$. Symbols of the user ID and the characteristic data illustrated in this table 400 are introduced for convenience only for mutual identification, and do not represent specific values by themselves.

The plurality of categories $V_1$ to $V_N$ may be set differently according to various embodiments. For example, when a plurality of categories are classified by reflecting the user's viewing pattern (e.g., video watch history on a website or a software application of a streaming service provider), $V_1$ may represent an application usage pattern, $V_2$ may represent a VOD viewing pattern, $V_3$ may represent preference of a content genre, and $V_N$ a broadcast channel viewing pattern. The characteristic data includes data on a user's viewing pattern required by each of these categories, and the format is not limited. However, the characteristic data is provided to be shown on a Euclidean plane by being represented by M-dimensional vector values (M is a natural number).

Hereinafter, a brief description will be given of the principle that the characteristic data is represented on the Euclidean plane.

Figure 5:
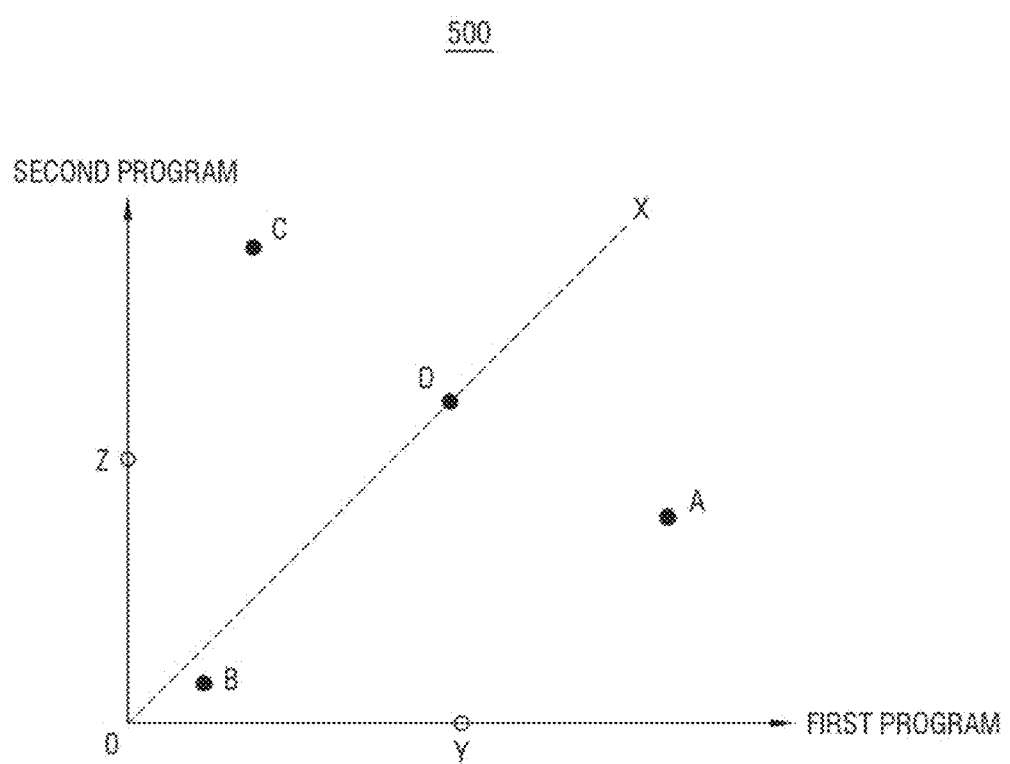
FIG. 5 is an exemplary diagram schematically illustrating a principle that characteristic data appears on a two-dimensional Euclidean plane.

FIG. 5 is an exemplary diagram schematically illustrating a principle that characteristic data appears on a two-dimensional Euclidean plane.

As illustrated in FIG. 5, it is exemplified that there is a Euclidean plane 500 in the case of including only two dimensions of a first program (e.g., a first TV program) and a second program (e.g., a second TV program) under the category of programs. A horizontal axis of the Euclidean plane 500 represents the number of times one user views or uses the first program, and a vertical axis of the Euclidean plane 500 represents the number of times the user views or uses the second program.

The Euclidean plane 500 may show the user's relative usage amount of the first program with regard to the second program based on a reference line X, may show the user's usage amount of the first program itself based on a reference point Y, and may show the user's usage amount of the second program itself based on a reference point Z. First characteristic data located below the reference line X indicates that the user uses the first program more than the second program, and second characteristic data located above the reference line X indicates that the user uses the second program more than the first program. If third characteristic data has a value less than the reference point Y, the third characteristic data indicates that a usage amount of the first program is high. If fourth characteristic data has a value less than the reference point Z, the fourth characteristic data indicates that a usage amount of the second program is high.

For example, as shown in FIG. 5, dots A, B, C, and D appearing on the Euclidean plane 500 correspond to characteristic data representing behavior patterns of users related to the first program and the second program, respectively. For example, the processor 420 may identify that characteristic data of dot A indicates a pattern in which the user uses the first program relatively more than the second program, based on the position of the dot A located below the reference line X. The processor 420 may identify that characteristic data of dot B indicates a pattern in which a user uses the first program slightly more than the second program, based on the position of the dot B located below the reference line X, and also indicated that the user uses both the first program and the second program relatively less based on the position of the dot B located below the reference points Y and Z. The processor 420 may identify that characteristic data of dot C indicates a pattern in which a user uses the first program more than the second program, based on the position of the dot C located above the reference line X. The processor 420 may identify that characteristic data of dot D that represents a pattern in which a user uses the first program and the second program at substantially the same ratio, based on the position of the dot D located on the reference line X.

The following predictions are possible from the pattern represented by each dot. It can be seen that the user corresponding to the dot A have a higher preference for the first program than the users corresponding to each of the dots B, C, and D. On the other hand, it can be seen that the user corresponding to the dot C have a higher preference for the second program than the users corresponding to each of the dots A, B, and D. It can be seen that the user corresponding to the dot D has a high preference for both the first program and the second program. It can be seen that the user corresponding to the dot B has a low preference for both the first program and the second program.

In addition, the distance between dots on the Euclidean plane 500, that is, the Euclidean distance, indicates the similarity of the tendency. Two dots that are close to each other represent a relatively similar tendency, and two dots that are far from each other represent a relatively different tendency. For example, it can be seen that the user corresponding to the dot A has a tendency more similar to the user corresponding to the dot D than the user corresponding to the dot B or C. It can be seen that the user corresponding to the dot C has a tendency more similar to the user corresponding to the dot D than the user corresponding to the dot A or B. Since the distance between the dot D and the dot B is farther than the distance between the dot D and the dot A or between the dot D and the dot C, it can be seen that the user of the dot B has a more different tendency than the user of the dot D than the user of the dot A or C.

Based on this prediction, the case of identifying a user who prefers a program having a tendency similar to the first program is considered. Several methods are possible, and the users corresponding to each of the dots A and D, which represents that the number of times of the first program is relatively higher may be selected. Alternatively, when the dot A predicted to prefer the first program is designated, the user corresponding to the dot D in which the Euclidean distance from the dot A is less than or equal to a predetermined threshold value may be selected.

In the same principle, when the dot C predicted to prefer the second program is designated, the user corresponding to the dot D in which the Euclidean distance from the dot C is less than or equal to a predetermined threshold value may be selected. If the threshold value is sufficiently large, the user corresponding to the dot A may also be selected.

In the present embodiment, a case has been described in which only two dimensions of the first program and the second program are included within one category related to the program. However, in reality, there are not only two programs used by the user, and a larger number of programs may be considered. From this point of view, the category includes M dimensions for M matters such as programs (M is a natural number that is higher than or equal to three), and the Euclidean plane 500 of the category also reflects M dimensions. That is, when one category is set to M dimensions, characteristic data of the corresponding category for each of the plurality of users is also provided to meet the M dimensions. Accordingly, the characteristic data of each of the plurality of users may be represented by dots on the Euclidean plane 500 for the same category.

The Euclidean plane 500, the Euclidean distance, and more details related thereto may be easily recognized by expanding the principles described in the above two dimensions based on the known mathematical principles, and therefore the description thereof will be omitted.

Hereinafter, a method of identifying a user with a tendency corresponding to reference characteristic from among big data on various users' tendencies will be described.

Figure 6:
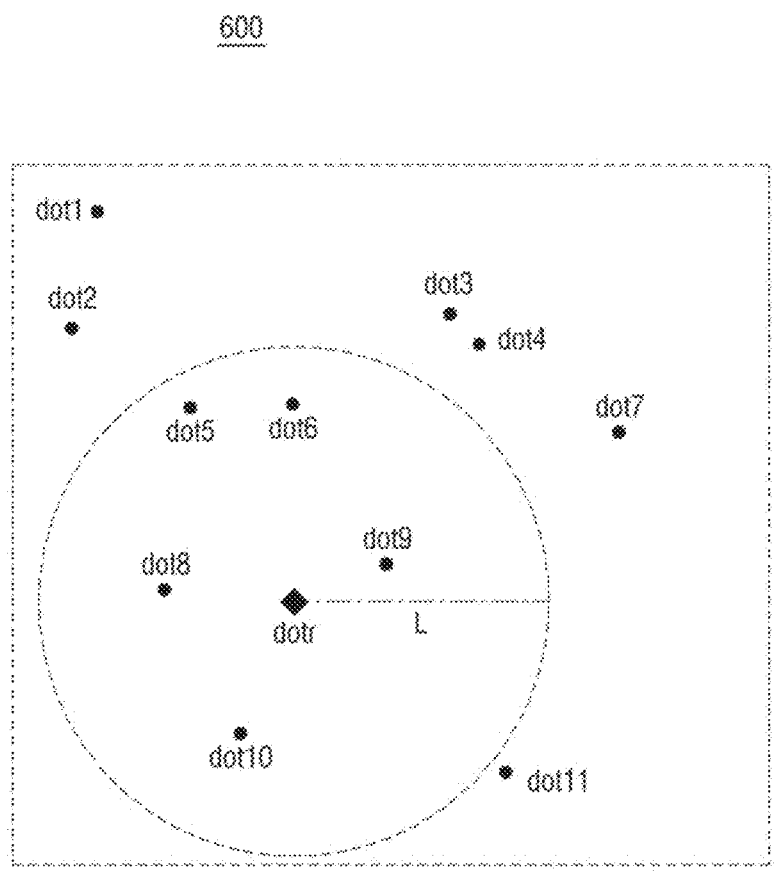
FIG. 6 is an exemplary diagram of one method of identifying similar characteristic data on a Euclidean plane of one category when one reference characteristic is input.

FIG. 6 is an exemplary diagram of one method of identifying similar characteristic data on a Euclidean plane of one category when one reference characteristic is input.

As illustrated in FIG. 6, the characteristic data corresponding to each of the plurality of users are represented as dots on a Euclidean plane 600 of one category. The electronic apparatuses 110 and 200 (see FIGS. 1 and 2) may obtain the characteristic data representing the user's tendency of each external apparatus from the plurality of communicable external apparatuses. In the case of this drawing, a total of 11 users' characteristic data from dot1 to dot11 are shown.

The electronic apparatus may receive characteristic data of a tendency of an interested user, that is, reference characteristic data, through the interface circuitry 210 (see FIG. 2) or the user input interface 220 (see FIG. 2). For example, a content provider providing advertising content may be a target of interest of users who prefer a specific program. In this case, the reference characteristic data for selecting interested users is required. The electronic apparatus may receive the reference characteristic data from the apparatus of the content provider through the interface circuitry 210 (see FIG. 2), or may receive the reference characteristic data from the administrator through the user input interface 220 (see FIG. 2). Here, the reference characteristic data per category may be one or two or more.

Hereinafter, a case will be described in which there is one reference characteristic data per category. In this case, the reference characteristic data is represented by one dot dotr on the Euclidean plane 600. Here, two criteria can be used to identify the user's characteristic data having a high similarity with respect to the reference characteristic data. One is a method of identifying one or more dots whose Euclidean distance from the dot dotr is within a predetermined threshold. The other is a method of identifying a predetermined number of dots arranged in an order of close Euclidean distance from the dot dotr.

For example, the predetermined threshold is set to a Euclidean distance L and the processor 240 may determine that user's characteristic data is similar to the reference characteristic data when a dot corresponding to the user's characteristic data is within the Euclidean distance L. The electronic apparatus identifies all dots within the range of the Euclidean distance L from the dot dotr of the reference characteristic data on the Euclidean plane 600. In the case of this drawing, there are 5 dots corresponding to this condition: dot5, dot6, dot8, dot9, and dot10. The electronic apparatus identifies the users of each of these identified dots as users meeting the requirements.

Figure 7:
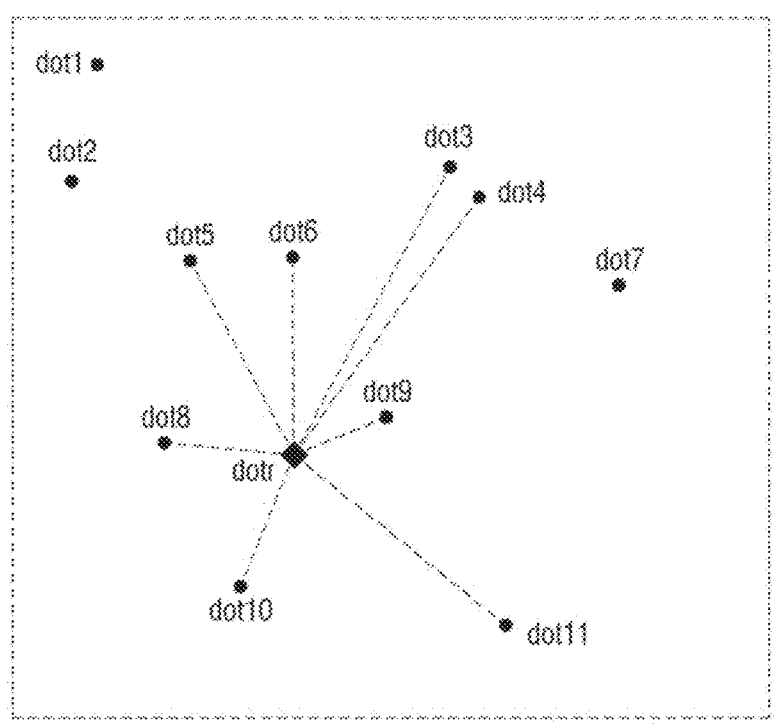
FIG. 7 is an exemplary diagram of one method of identifying similar characteristic data on a Euclidean plane of one category when one reference characteristic is input.

FIG. 7 is an exemplary diagram of one method of identifying similar characteristic data on a Euclidean plane of one category when one reference characteristic is input.

As illustrated in FIG. 7, the electronic apparatuses 110 and 200 (see FIGS. 1 and 2) may be specified to identify eight dots arranged in the order from closest to farthest from the dot dotr of the reference characteristic data among dots on a Euclidean plane 700 of one category. Among the dots of the characteristic data of the user's tendency, the eight dots, dot3, dot4, dot5, dot6, dot 8, dot 9, dot10, and dot11 meet the requirement of being within the range of the Euclidean distance L, and the eight dots arranged in the order from closest to farthest from the dot dotr are: dot9, dot8, dot10, dot6, dot5, dot 11, dot 4, and dot3. The electronic apparatus identifies the users of each of these identified dots as users meeting the requirements.

This method may be applied when identification results of more than a predetermined number of users are required in big data. Depending on embodiments, both methods described above may be applied. For example, as in the present embodiment, a method of identifying a predetermined number of users or more in big data, but excluding users corresponding to dots whose Euclidean distance from the reference characteristic data is farther than a threshold value is also possible.

Figure 8:
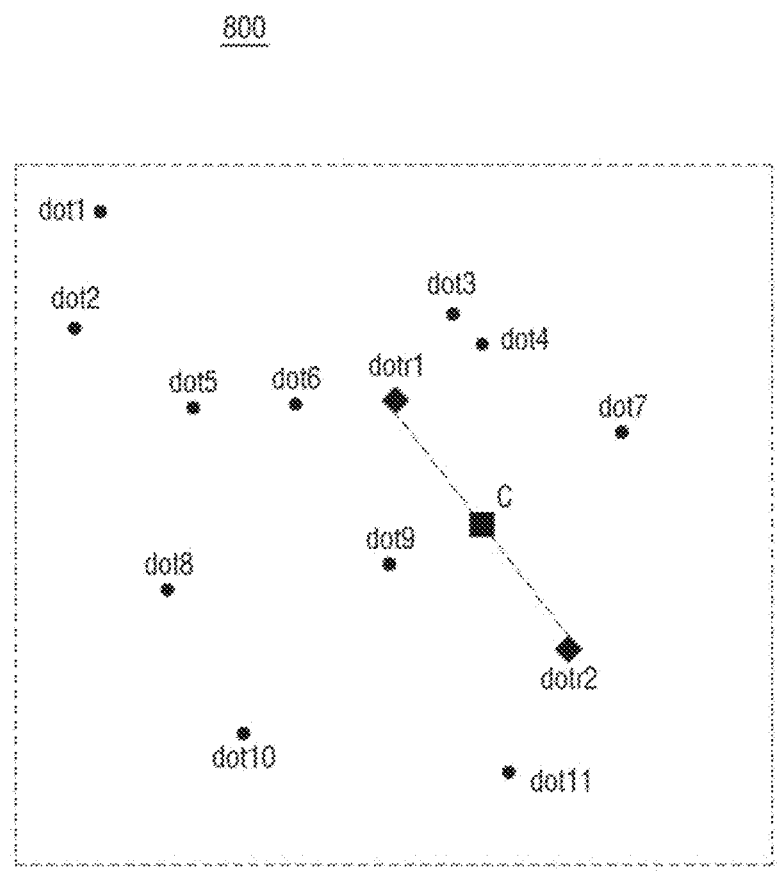
FIG. 8 is an exemplary diagram of a method of identifying similar characteristic data on a Euclidean plane of one category when two reference characteristics are input.

FIG. 8 is an exemplary diagram of a method of identifying similar characteristic data on a Euclidean plane of one category when two reference characteristics are input.

As illustrated in FIG. 8, the electronic apparatus 110 and 200 (see FIGS. 1 and 2) may each represent dots dotr1 and dotr2 corresponding to two reference characteristic data on a Euclidean plane 800 of one category. When a plurality of reference characteristics are input as described above, the electronic apparatus may identify user-corresponding dots with high similarity according to various methods. In one method, according to the same principle as the previous embodiment, the electronic apparatus can individually apply the similarity based on the Euclidean distance to each of the dots dotr1 and dotr2 corresponding to the reference characteristic data.

As another method, the electronic apparatus may derive centroids C of dots dotr1 and dotr2 corresponding to a plurality of reference characteristic data, and apply a similarity based on the Euclidean distance based on the derived centroids C. A centroid, a center of gravity, or a center of drawing represents a center of a certain area on the plane. A cross-sectional first moment with respect to any axis through the centroid is zero. A cross-sectional first moment $S_x$ is one obtained by obtaining and summing each small cross-sectional area dA and a full cross-sectional area with a distance y to an x axis when a cross-section and a certain axis x are given. That is, $S_{x0}$ with respect to the axis passing through the center of the cross section is 0. The centroid is a geometric center within a polygon where coordinate values of all points included in a given area are averaged, and is calculated as the coordinate average of the points constituting the polygon. In the case of this embodiment, the centroid C becomes a point at a position at the same distance from the dots dotr1 and dotr2 corresponding to the plurality of reference characteristic data. In this embodiment, a case will be described in which there are two reference characteristic data, but the same principle may be applied even when there are three or more reference characteristic data.

The electronic apparatus identifies dots having high similarity among several dots on the Euclidean plane 800 based on the derived centroid C. The identification method is substantially the same as the identification based on one reference characteristic data in the previous embodiment.

The electronic apparatus calculates the similarity of each user to the reference characteristic data using the method of the Euclidean plane and the Euclidean distance as described above. When the reference characteristic data for each category is received, the electronic apparatus calculates the similarity of the user's characteristic data to the reference characteristic data in each category for any one user, and sums similarities of all categories to calculate a final similarity. When the final similarity of all users is calculated, the electronic apparatus identifies users having a relatively high final similarity.

By calculating the similarity of the characteristic data for each of the plurality of categories as described above, the electronic apparatus may more accurately identify the similarity of the characteristic data of each user for the reference characteristics.

In this case, as the method of calculating the final similarity, there are a method in which a weight are not applied to a plurality of categories (or the same weight is applied to a plurality of categories), and a method in which different weights are applied to a plurality of categories. In particular, the latter case may be used in situations where users are identified by reflecting the requirements more accurately when the reference characteristics are relatively specific and include detailed requirements.

Hereinafter, the difference between the case where the weight is not applied to the plurality of categories and the case where the weight is applied to the plurality of categories will be described.

Figure 9:
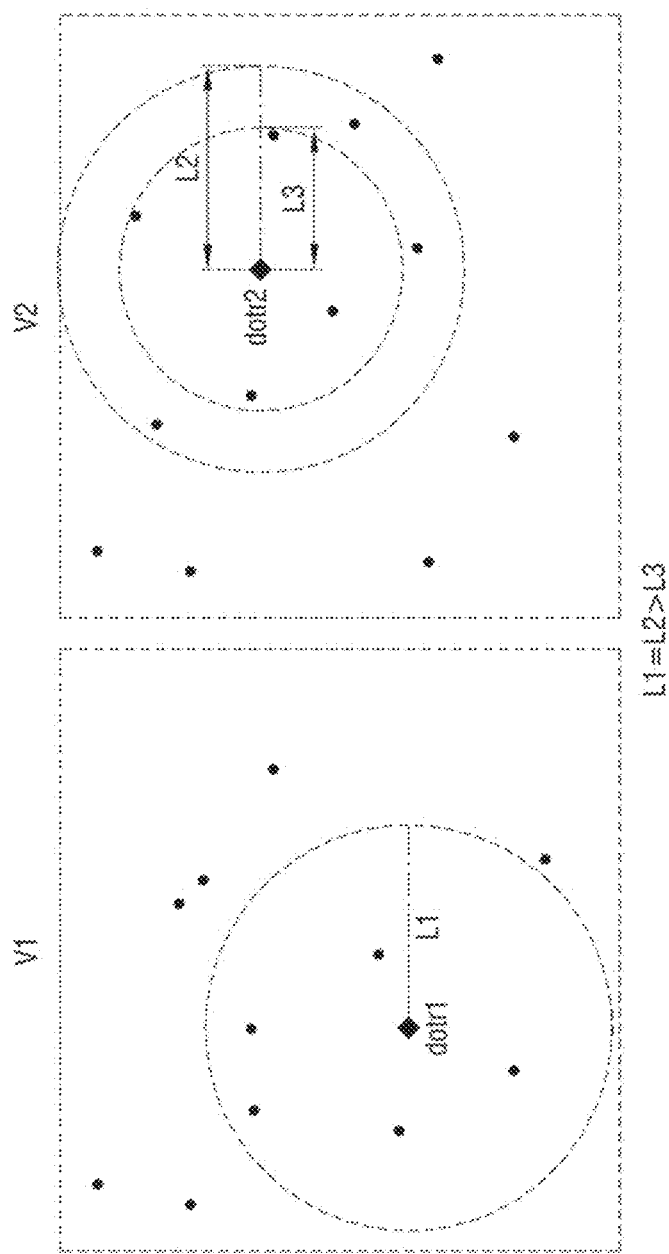
FIG. 9 is an exemplary diagram illustrating a difference between when a weight is not applied and when a weight is applied on the Euclidean planes of two categories.

FIG. 9 is an exemplary diagram illustrating a difference between when a weight is not applied and when a weight is applied on the Euclidean planes of two categories.

As illustrated in FIG. 9, dots corresponding to the characteristic data of each category of users are represented on the Euclidean plane of two different categories V1 and V2. Further, dots corresponding to the reference characteristic data for each category are represented on each Euclidean plane. The dot dotr1 corresponding to the reference characteristic data is represented for the category V1, and the dot dotr2 corresponding to the reference characteristic data is represented for the category V2.

For example, the case of identifying the user's dot for each category based on the threshold value of the Euclidean distance is considered. When a threshold value L1 of the Euclidean distance is set in the category V1, the processor 240 may identify dots within the Euclidean distance L1 from the dot dotr1. On the other hand, when a threshold value L2 or L3 of the Euclidean distance is set in the category $V_2$, the processor 240 may identify dots within the Euclidean distance L2 or L3 from the dot dotr2. In the present embodiment, L2 is the same as L1, and tL3 is smaller than L1, but the embodiment is not limited thereto.

If the threshold value L2 is set in the category V2, the identification range of the dot in the category V1 and the identification range of the dot in the category V2 represent the same area. This represents that the weights of each of the categories V1 and V2 are the same. If there are only two categories V1 and V2 of the reference characteristic, this means that a weight is not assigned to the category.

If the threshold value L3 is set in the category V2, the area of the identification range of the dot in the category V1 is larger than that of the identification range of the dot in the category V2. This represents that the weight for the category V1 is greater than the weight for the category V2. In this case, the proportion of the category V1 is greater than that of the category V2 in the similarity with respect to the reference characteristic.

Hereinafter, the method of calculating the final similarity relative to the reference characteristic of any one user will be described when the weights for each category are not reflected and when the weights are reflected, respectively.

Figure 10:
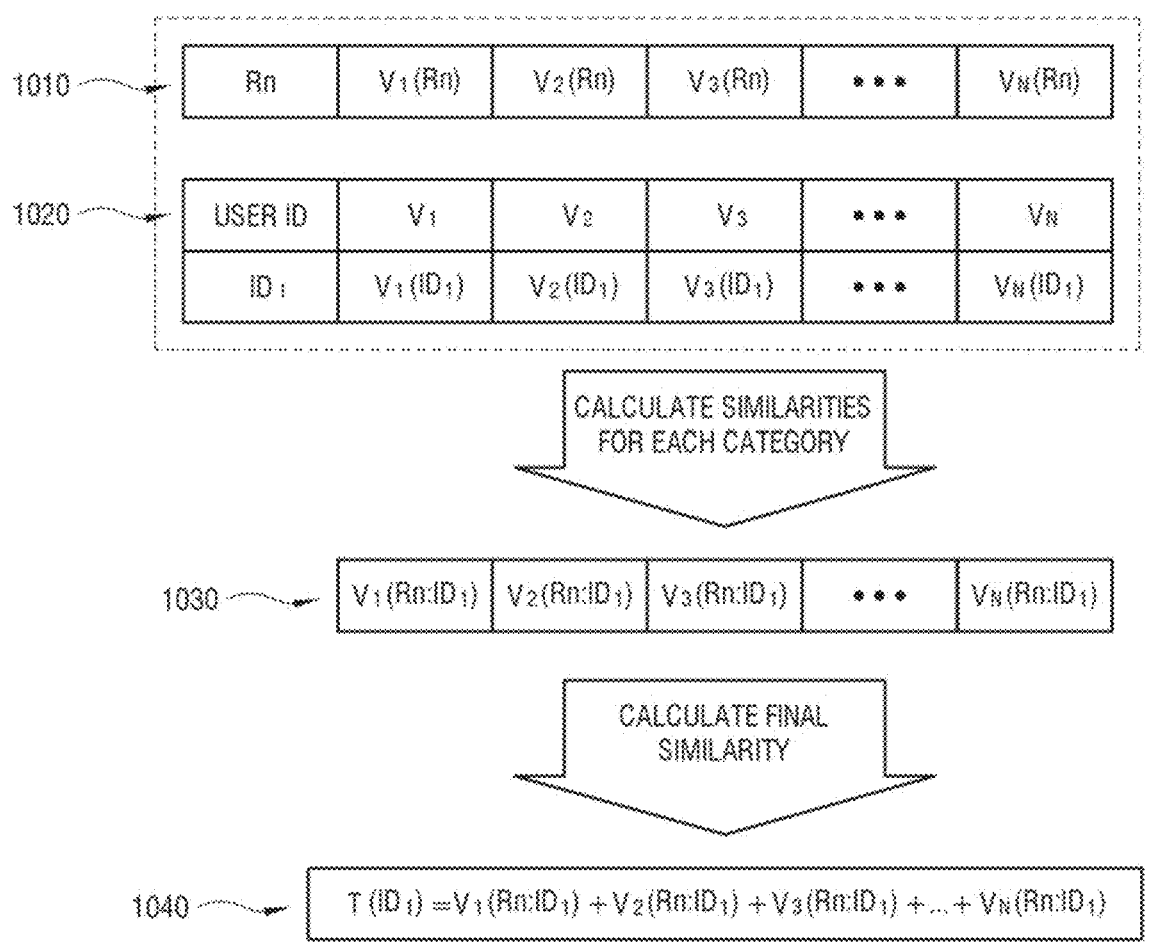
FIG. 10 is an exemplary diagram of a method of calculating final similarity with respect to reference characteristics of a user when a weight for each category is not reflected.

FIG. 10 is an exemplary diagram of a method of calculating a final similarity with respect to a reference characteristic of any one user when the weights for each category is not reflected.

As illustrated in FIG. 10, reference characteristic data 1010 and characteristic data 1020 of the user $ID_1$ are provided. When there are a total of N categories, the characteristic data 1020 of the user $ID_1$ includes the characteristic data $V_1$ ($ID_1$) for the category $V_1$, the characteristic data $V_2$ ($ID_1$) for the category $V_2$, and the characteristic data $V_3$ ($ID_1$) for the category $V_3$, . . . characteristic data $V_N$ ($ID_1$) for the category $V_N$. On the other hand, the reference characteristic data 1010 includes the reference characteristic data $V_1$ (Rn) for the category $V_1$, the reference characteristic data $V_2$ (Rn) for the category $V_2$, the reference characteristic data $V_3$ (Rn) for the category $V_3$, . . . , the reference characteristic data $V_N$ (Rn) for the category $V_N$.

The electronic apparatuses 110 and 200 (see FIGS. 1 and 2) calculate a similarity 1030 of the characteristic data 1020 of the user $ID_1$ to the reference characteristic data 1010 for each category based on this data. For example, for convenience, the similarity of the characteristic data of the user $ID_1$ in the category $V_1$ may be represented by $V_1$ (Rn: $ID_1$), the similarity of the characteristic data of the user $ID_1$ in the category $V_2$ may be represented by $V_2$ (Rn: $ID_1$), the similarity of the characteristic data of the user $ID_1$ in the category $V_3$ may be represented by $V_3$ (Rn: $ID_1$), . . . , the similarity of the characteristic data of the user $ID_1$ in the category $V_N$ may be represented by $V_N$ (Rn: $ID_1$), and the like.

In the case of not assigning the weights for each category, the electronic apparatus calculates the final similarity 1040 of the characteristic data of the user $ID_1$ by summing the similarities 1030 of the characteristic data of the user $ID_1$ for each category. For example, when the final similarity 1040 of the characteristic data of the user $ID_1$ is $T(ID_1)$, it may be represented as follows:

$$T(ID_1)=V_1(Rn:ID_1)+V_2(Rn:ID_1)+V_3(Rn:ID_1)+\ldots+V_N(Rn:ID_1)$$

The electronic apparatus calculates the final similarity 1040 of each user in this way, compares the final similarities 1040 of each user to select users showing the final similarities 1040 within a predetermined ranking, or may users based on predetermined threshold values of the final similarities 1040.

Figure 11:
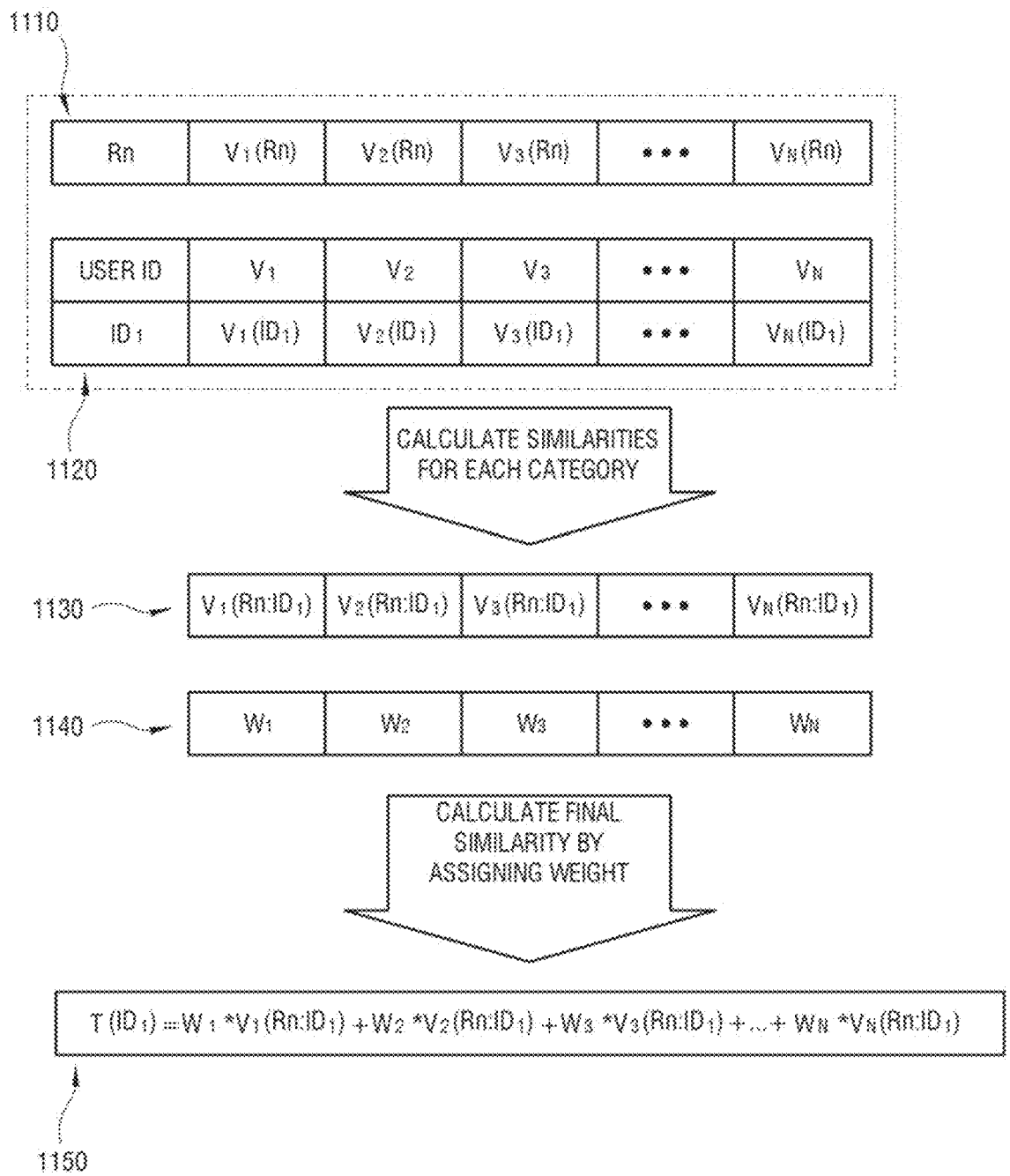
FIG. 11 is an exemplary diagram of a method of calculating final similarity with respect to reference characteristics of a user when weights for each category are not reflected.

FIG. 11 is an exemplary diagram of a method of calculating a final similarity with respect to a reference characteristic of a user when weights for each category are not reflected.

As illustrated in FIG. 11, reference characteristic data 1110 and characteristic data 1120 of the user $ID_1$ are provided. The electronic apparatuses 110 and 200 (see FIGS. 1 and 2) calculate a similarity 1130 of the characteristic data 1120 of the user $ID_1$ to the reference characteristic data 1110 for each category based on this data. The contents up to this step are substantially the same as the embodiment of FIG. 10, and a description thereof will be omitted.

In the present embodiment, weights 1140 are set for each of a plurality of categories, and this weights may be input by the administrator of the electronic apparatus or may be provided from a provider providing the reference characteristic data. For example, a weight $W_1$ for the category $V_1$, a weight $W_2$ for the category $V_2$, a weight $W_3$ for the category $V_3$, ..., a weight $W_N$ for the category $V_N$, and the like may be provided.

Since various methods are possible as to what value the weights 1140 for each category are set, a specific value of the weight 1140 may not be limited. For example, the total sum of the weights 1140, that is, $W_1+W_2+W_3+\ldots+W_N$ is set to 100%, and a ratio of each weight 1140 within 100% is adjusted according to the reference characteristics. If the importance of the category $V_1$ is the highest in the reference characteristic, the ratio of the weight 1140 $W_1$ is set to be higher than that of the other weights 1140. Alternatively, the weights 1140 for each category may each be set to have different values, and the weight 1140 of a category having a high importance may be set to have a relatively higher value than the weight 1140 of other categories.

The electronic apparatus calculates the final similarity 1150 of the user ID1 to the reference characteristic by assigning and summing the weights 1140 for each category to the similarity 1130. For example, when the final similarity 1150 of the characteristic data of the user $ID_1$ is $T(ID_1)$, it may be represented as a weighted sum of the similarities $V_1$ (Rn: $ID_1$), $V_2$ (Rn: $ID_1$), $V_3$(Rn: $ID_1$), ..., and $V_N$(Rn: $ID_1$), as follows:

$$T(ID_1)=W_1*V_1(Rn:ID_1)+W_2*V_2(Rn:ID_1)+W_3*V_3(Rn:ID_1)+\ldots+W_N*V_N(Rn:ID_1)$$

Here, the asterisk symbol "*" may represent a multiplication calculation or another preset operation depending on embodiments. Depending on which of the weights 1140 for each category is assigned a relatively high value, the similarity of the user's characteristic data to the reference characteristic is different, and as a result, the user finally identified may be different.

For example, a case is considered in which the reference characteristic is set to a user who "watches a sports channel at night". In this case, the categories of the characteristic data of the user may be set to three categories: "late night", "sports", and "broadcast channel". If there is no difference in weights between the categories, the identification results having a high similarity with respect to the reference characteristics will include all of "users who are active at night", "users who like sports", and "users who frequently watch broadcast channels".

On the other hand, a case may be considered in which the reference characteristic puts more weight on users who like "sports" among the three categories of "late night", "sports", and "broadcast channel". In this case, a relatively high number of weights are set for the "sports" related category, and the identification results having a high similarity with respect to the reference characteristics represent that the ratio of "users who like sports" is relatively high.

In this way, by setting the weight of the category that the reference characteristics is important to relatively high, the electronic apparatus may identify users having the tendency more meeting the reference characteristics.

Hereinafter, a description will be given of a process in which the electronic apparatus identifies users having similar tendency to the reference characteristic within big data.

Figure 12:
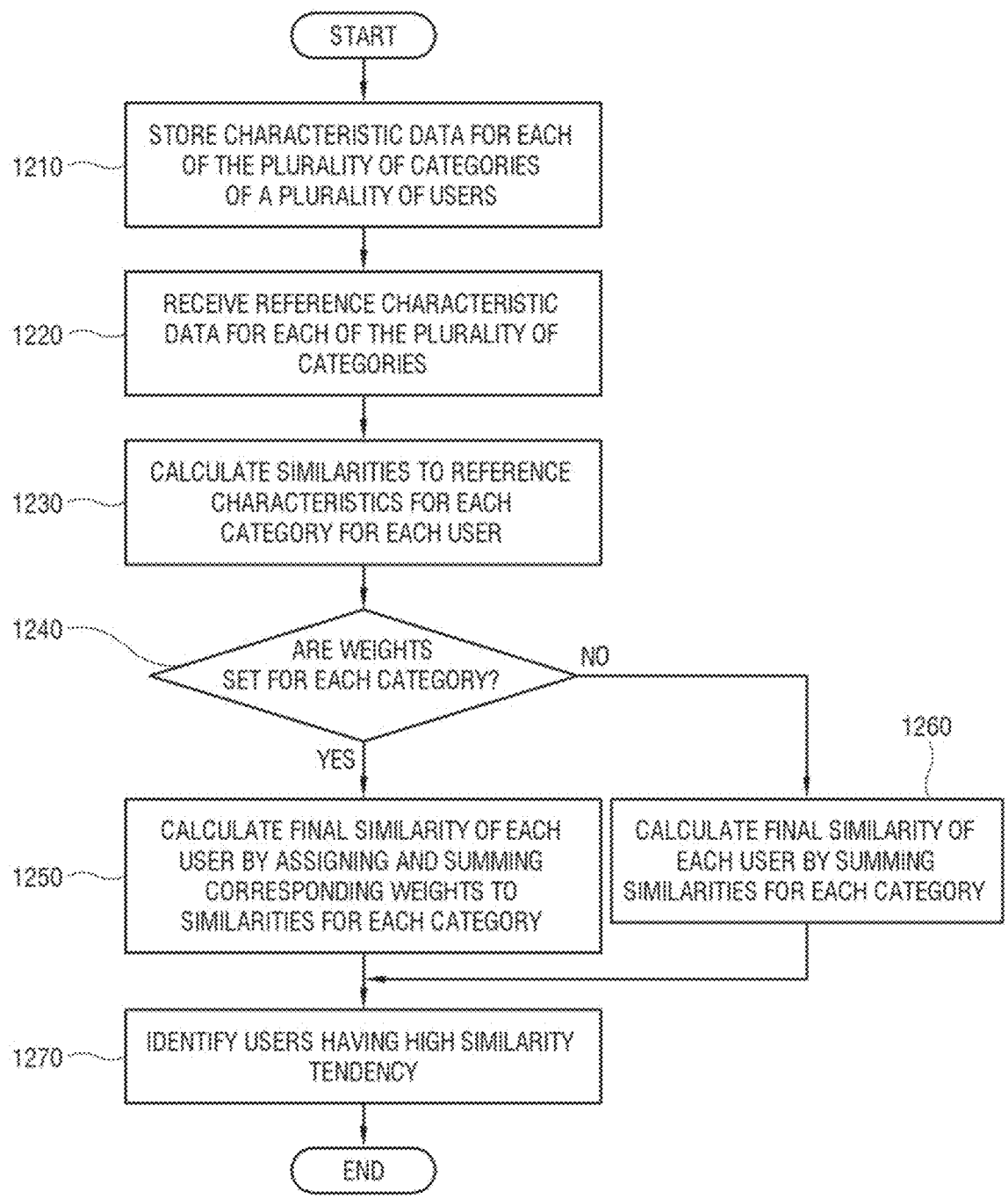
FIG. 12 is a flowchart illustrating a method of controlling an electronic apparatus when the weights for each category may be set.

FIG. 12 is a flowchart illustrating a method of controlling an electronic apparatus when the weights for each category may be set.

As illustrated in FIG. 12, the following operations are performed by the processor 240 of the electronic apparatus 110 and 200 (see FIGS. 1 and 2).

In operation 1210, the electronic apparatus stores characteristic data for each of the plurality of categories of a plurality of users.

In operation 1220, the electronic apparatus receives reference characteristic data for each of the plurality of categories.

In operation 1230, the electronic apparatus calculates a similarity with respect to a reference characteristic for each category for each user.

In operation 1240, the electronic apparatus identifies whether weights are set for each category.

When it is identified that the weights are set for each category in operation 1240, the method proceeds to operation 1250, in which the electronic apparatus assigns and sums weights to the similarities for each category to calculate the final similarities of each user.

On the other hand, if it is identified that the weights are not set for each category in operation 1240, the method proceeds to operation 1260, the electronic apparatus calculates the final similarities of each user by summing the similarity for each category.

In operation 1270, the electronic apparatus identifies users with a tendency having a high similarity (e.g., a similarity higher than a threshold value) with respect to the reference characteristic based on the calculated final similarities of each user.

Hereinafter, an operation of the electronic apparatus related to categories and weights according to an embodiment of the disclosure will be additionally described.

As an example, the electronic apparatus may receive only weights among categories and weights. The electronic apparatus displays a plurality of categories and a user interface (UI) for designating or inputting weights for each category. When the user inputs weights for each category through the UI, the electronic apparatus acquires the weights input through the UI. Here, a plurality of categories may be determined in advance, or a plurality of corresponding categories may be automatically selected based on a reference characteristic. In the case of the automatic selection, various determination methods including artificial intelligence (AI) algorithms can be used.

As an example, the electronic apparatus may receive both categories and weights. The electronic apparatus may display a UI, and the UI is provided to select a category to be analyzed from among a plurality of categories, and to designate the weights for each selected category.

As an example, the electronic apparatus may receive only weights among categories and weights. The electronic apparatus displays a UI provided to enable selection of a category to be analyzed among a plurality of categories, and identifies a category selected by the user through the UI. In this case, the weight to be assigned to each selected category may be a predetermined value, or the corresponding value may be automatically designated for each category based on the reference characteristic. When weights are automatically designated for each category, the designated value can be determined using various determination methods including AI algorithms.

Meanwhile, the control method of the electronic apparatus may be performed using an artificial intelligence model.

In the control method of an electronic apparatus according to the embodiment of the disclosure, the artificial intelligence model for executing at least one of a method of setting weights for each category when reference characteristic data is received, a method of assigning the set weights to the similarities for each category to calculate the final similarity, or a method of determining a reference (ranking, threshold value) identifying users with tendency having a high similarity based on the calculated final similarities of each user may be used. In addition, the processor of the electronic apparatus can convert the input data into a form suitable for use as an input of an artificial intelligence model. The artificial intelligence model may be created through learning. Here, the artificial intelligence model created by the learning means that a basic artificial intelligence model is trained using a plurality of training data by a learning algorithm, so that the predefined motion rule or the artificial intelligence model set to perform the desired characteristic (or purpose) is created. The AI model may be configured of a plurality of neural network layers. Each of the plurality of neural network layers has a plurality of weight values, and performs a neural network operation through an operation between a calculation result of a previous layer and a plurality of weights.

Inference prediction is a technology that logically reasons and predicts information by determining information, and includes knowledge-based reasoning, optimization prediction, preference-based planning, recommendation, and the like.

For example, when the reference characteristic data is received, the electronic apparatus uses an artificial intelligence model to determine which of each category of the reference characteristic data is important, and how much weight to set for the category determined to be important. Further, as the analysis operation described in the above-described embodiment is repeated, learning may be performed to adjust the setting of the category or weight.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus, comprising:
a communication interface circuitry; and
a processor configured to:
acquire a plurality of user characteristic data of a plurality of users through the communication interface circuitry;
identify a plurality of categories and reference characteristics for analyzing the plurality of user characteristic data according to an input received through the communication interface circuitry, wherein the plurality of categories are classified by a user behavior pattern derived from a usage history of an external apparatus;
identify specific user characteristic data that corresponds to the reference characteristics, among the plurality of user characteristic data for each of the plurality of categories, based on a similarity between the reference characteristics and the specific user characteristic data, wherein the plurality of categories comprise at least of two of an application usage pattern, a video on demand (VOD) viewing pattern, a preference of a content genre, and a broadcast channel viewing pattern;
obtain first similarities between the plurality of user characteristic data and the reference characteristics for each of the plurality of categories;
obtain a second similarity by assigning a set of weights to the first similarities for the plurality of categories and integrating the first similarities to which the set of weights are assigned;
identify a specific user having the specific user characteristic data based on the second similarity, among the plurality of users; and
output an analysis result of the specific user characteristic data of the specific user.

2. The electronic apparatus of claim 1, wherein the processor is further configured to identify the specific user based on the second similarity of the specific user characteristic data with respect to the reference characteristics being higher than or equal to a predetermined ranking.

3. The electronic apparatus of claim 1, wherein the processor is further configured to identify the specific user, based on the second similarity of the specific user characteristic data with respect to the reference characteristics being greater than or equal to a threshold value.

4. The electronic apparatus of claim 1, wherein the weights are provided differently according to predetermined importance values that are respectively set for the plurality of categories.

5. The electronic apparatus of claim 1, wherein the processor is further configured to derive a centroid of the reference characteristics, and identify whether the specific user characteristic data corresponds to the reference characteristics based on an Euclidean distance between the centroid and the specific user characteristic data of the specific user.

6. The electronic apparatus of claim 5, wherein the centroid is an average of coordinate values of the reference characteristics on a Euclidean plane.

7. A control method of an electronic apparatus, comprising:
   acquiring a plurality of user characteristic data of a plurality of users;
   identifying a plurality of categories and reference characteristics for analyzing the plurality of user characteristic data according a received input;
   identifying specific user characteristic data that corresponds to the reference characteristics, among the plurality of user characteristic data for each of the plurality of categories, based on a similarity between the reference characteristics and the specific user characteristic data, wherein the plurality of categories are classified by a user behavior pattern derived from a usage history of an external apparatus, and wherein the plurality of categories comprise at least two of an application usage pattern, a video on demand (VOD) viewing pattern, a preference of a content genre, and a broadcast channel viewing pattern;
   obtaining first similarities between the plurality of user characteristic data and the reference characteristics for each of the plurality of categories;
   obtaining a second similarity by assigning a set of weights to the first similarities for the plurality of categories and integrating the first similarities to which the set of weights are assigned;
   identifying a specific user having the specific user characteristic data based on the second similarity, among the plurality of users; and
   outputting an analysis result of the specific user characteristic data of the specific user.

8. The control method of claim 7, wherein the identifying the specific user comprises:
   identifying the specific user based on the second similarity of the specific user characteristic data with respect to the reference characteristics being higher than or equal to a predetermined ranking.

9. The control method of claim 7, wherein the identifying the specific user comprises:
   identifying the specific user based on the second similarity of the specific user characteristic data with respect to the reference characteristics being greater than or equal to a threshold value.

10. The control method of claim 7, wherein the assigning the set of weights comprises:
   providing the weights differently according to predetermined importance values that are respectively set for the plurality of categories.

* * * * *